(12) United States Patent
Seidler et al.

(10) Patent No.: US 10,576,725 B2
(45) Date of Patent: Mar. 3, 2020

(54) METHOD OF PRODUCING A PLURALITY OF ENGINEERED-COMPONENTS USING AN ADDITIVE MANUFACTURING PROCESS

(71) Applicant: Aptiv Technologies Limited, St. Michael (BB)

(72) Inventors: Robert J. Seidler, Warren, OH (US); Gerald A. Rhinehart, Jr., Lordstown, OH (US)

(73) Assignee: Aptiv Technologies Limited (BB)

( * ) Notice: Subject to any disclaimer, the term of this patent is extended or adjusted under 35 U.S.C. 154(b) by 155 days.

(21) Appl. No.: 15/492,411

(22) Filed: Apr. 20, 2017

(65) Prior Publication Data
US 2018/0304547 A1 Oct. 25, 2018

(51) Int. Cl.
*B29C 64/40* (2017.01)
*B33Y 10/00* (2015.01)

(52) U.S. Cl.
CPC .................................... *B33Y 10/00* (2014.12)

(58) Field of Classification Search
CPC ....... B29C 64/245; B29C 64/40; B29C 64/10; B29C 64/20; B29C 64/171; B29C 67/0051; B33Y 10/00; B33Y 30/00; B33Y 70/00; B33Y 50/02
USPC ........................................................ 264/401
See application file for complete search history.

(56) References Cited

U.S. PATENT DOCUMENTS

| 2012/0113439 | A1* | 5/2012 | Ederer | B22F 1/0059 |
| | | | | 358/1.9 |
| 2016/0031010 | A1 | 2/2016 | O'Neill et al. | |
| 2016/0107234 | A1 | 4/2016 | Craeghs et al. | |
| 2018/0214947 | A1* | 8/2018 | Haro Gonzalez | B22F 3/1055 |
| 2018/0214984 | A1* | 8/2018 | Haro Gonzalez | B33Y 30/00 |
| 2018/0230246 | A1* | 8/2018 | Vidavsky | B33Y 70/00 |

* cited by examiner

*Primary Examiner* — Jacob T Minskey
*Assistant Examiner* — Cedrick S Williams
(74) *Attorney, Agent, or Firm* — Robert J. Myers

(57) ABSTRACT

A method of producing engineered-components using an additive manufacturing process includes the steps of, providing a build-platform, forming a first engineered-component, forming support-structures, forming a second engineered-component, and removing the support-structures. The step of providing a build-platform includes providing a build-platform on which to form an engineered-component. The step of forming a first engineered-component includes depositing a first plurality of layers of a material onto the build-platform and solidifying the first plurality of layers. The step of forming support-structures includes forming a plurality of support-structures by depositing a second plurality of layers of the material onto the build-platform and solidifying the second plurality of layers. The step of forming a second engineered-component includes depositing a third plurality of layers of the material onto the plurality of support-structures and solidifying the third plurality of layers. The step of removing the support-structures includes removing the support-structures from the second engineered-component.

14 Claims, 3 Drawing Sheets

METHOD OF PRODUCING A PLURALITY OF ENGINEERED-COMPONENTS USING AN ADDITIVE MANUFACTURING PROCESS

TECHNICAL FIELD OF INVENTION

This disclosure generally relates to a method of producing engineered-components using an additive manufacturing process, and more particularly relates to a method of producing multiple engineered-components on a single build-platform.

BACKGROUND OF INVENTION

It is known to fabricate a three dimensional object such as an engineered-component directly from a computer model or data file using additive manufacturing processes, e.g. 3D printing. Support structures may be used to prevent deformation of the engineered-component when complex geometries exist. 3D printing machines typically print one layer of engineered-components attached to the build platform by these support structures. Recently introduced 3D printings machines can print 10 times faster than previous 3D printing machines. Build times are significantly reduced to 3 hours or less but their build envelope on their build-platform is limited. If a build of an engineered-component is started at the end of a work day, the engineered-component will be finished a few hours later leaving the machine idle until the start of the next work day.

SUMMARY OF THE INVENTION

In accordance with one embodiment, a method of producing a plurality of engineered-components using an additive manufacturing process is provided. The method includes the steps of, providing a build-platform, forming a first engineered-component, forming support-structures, forming a second engineered-component, and removing the support-structures. The step of providing a build-platform includes providing a build-platform on which to form an engineered-component. The step of forming a first engineered-component includes depositing a first plurality of layers of a material onto the build-platform and solidifying the first plurality of layers. The step of forming the support-structures includes forming a plurality of support-structures distinct from the first engineered-component by depositing a second plurality of layers of the material onto the build-platform and solidifying the second plurality of layers, wherein this step is performed simultaneously with the step of forming the first engineered-component. The step of forming the second engineered-component includes depositing a third plurality of layers of the material onto the plurality of support-structures and solidifying the third plurality of layers, wherein this step is performed subsequent to the step of forming the first engineered-component. The step of removing the support-structures includes removing the plurality of the support-structures from the second engineered-component.

In accordance with another embodiment, a method of producing a plurality of engineered-components using an additive manufacturing process is provided. The method includes the steps of, providing a build-platform, forming a first engineered-component, forming support-structures, forming second support-structures, forming a second engineered-component, removing the support-structures, and removing the second support-structures. The step of providing a build-platform includes providing a build-platform on which to form an engineered-component. The step of forming a first engineered-component includes depositing a first plurality of layers of a material onto the build-platform and solidifying the first plurality of layers. The step of forming the support-structures includes forming a plurality of support-structures distinct from the first engineered-component by depositing a second plurality of layers of the material onto the build-platform and solidifying the second plurality of layers, wherein this step is performed simultaneously with the step of forming the first engineered-component. The step of forming the second support-structures includes forming a second plurality of support-structures distinct from the plurality of support-structures by depositing a third plurality of layers of the material onto the formed first engineered-component and solidifying the third plurality of layers, wherein the second plurality of support-structures are interposed between the first engineered-component and a second engineered-component. The step of forming the second engineered-component includes depositing a fourth plurality of layers of the material onto the plurality of support-structures and onto the second plurality of support-structures and solidifying the fourth plurality of layers, wherein this step is performed subsequent to the step of forming the first engineered-component. The step of removing the support-structures includes removing the plurality of the support-structures from the second engineered-component. The step of removing the second support-structures includes removing the second plurality of the support-structures from the first-engineered-component and from the second engineered-component.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

The reference numbers of similar elements in the embodiments shown in the various figures share the last two digits.

DETAILED DESCRIPTION

A method of producing multiple engineered-components using an additive manufacturing process, e.g. a 3D printing machine. The engineered-components may be formed stacked one on top of the other separated by support structures. This allows multiple engineered components to be built within a limited build envelope. This method may increase the build time but allows better utilization of the additive manufacturing process if the build of the engineered-components is started at the end of a work day. As used herein, an engineered-component is any device or assembly formed by the additive manufacturing process that is later incorporated into another device or assembly. This is in contrast to the support structures which are created during the process of forming the engineered-component and are then removed from the engineered-component and are then discarded or recycled.

Figure 1:
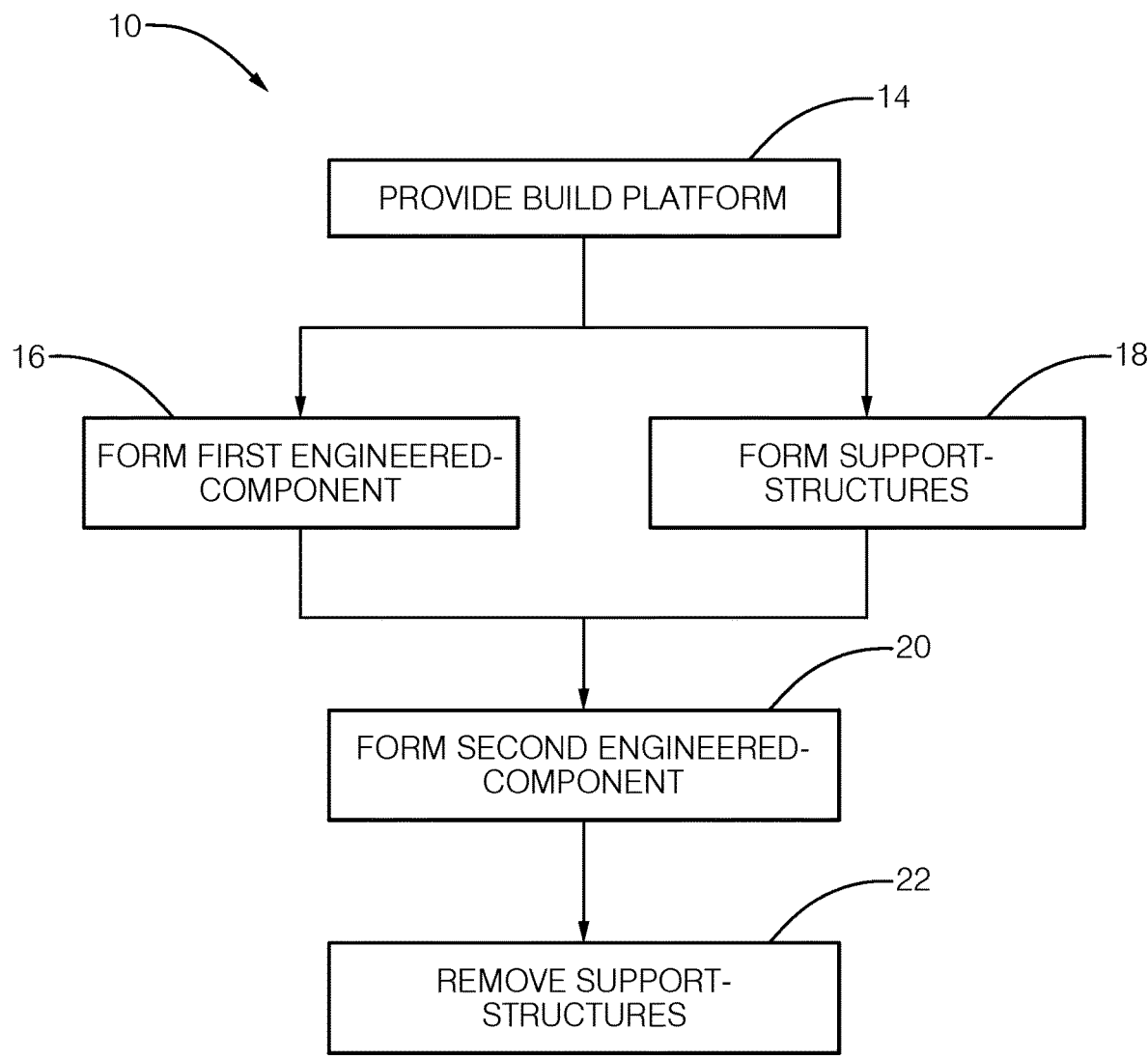
FIG. 1 is a flow chart of a method of producing a plurality of engineered-components using an additive manufacturing process in accordance with one embodiment.

FIG. 1 is a flowchart that illustrates a non-limiting example of a method 10 of producing a plurality of engineered-components 12 using an additive manufacturing process. The method 10 includes the steps of, providing a build-platform 14, forming a first engineered-component 16, forming support-structures 18, forming a second engineered-component 20, and removing the support-structures 22.

Figure 2:
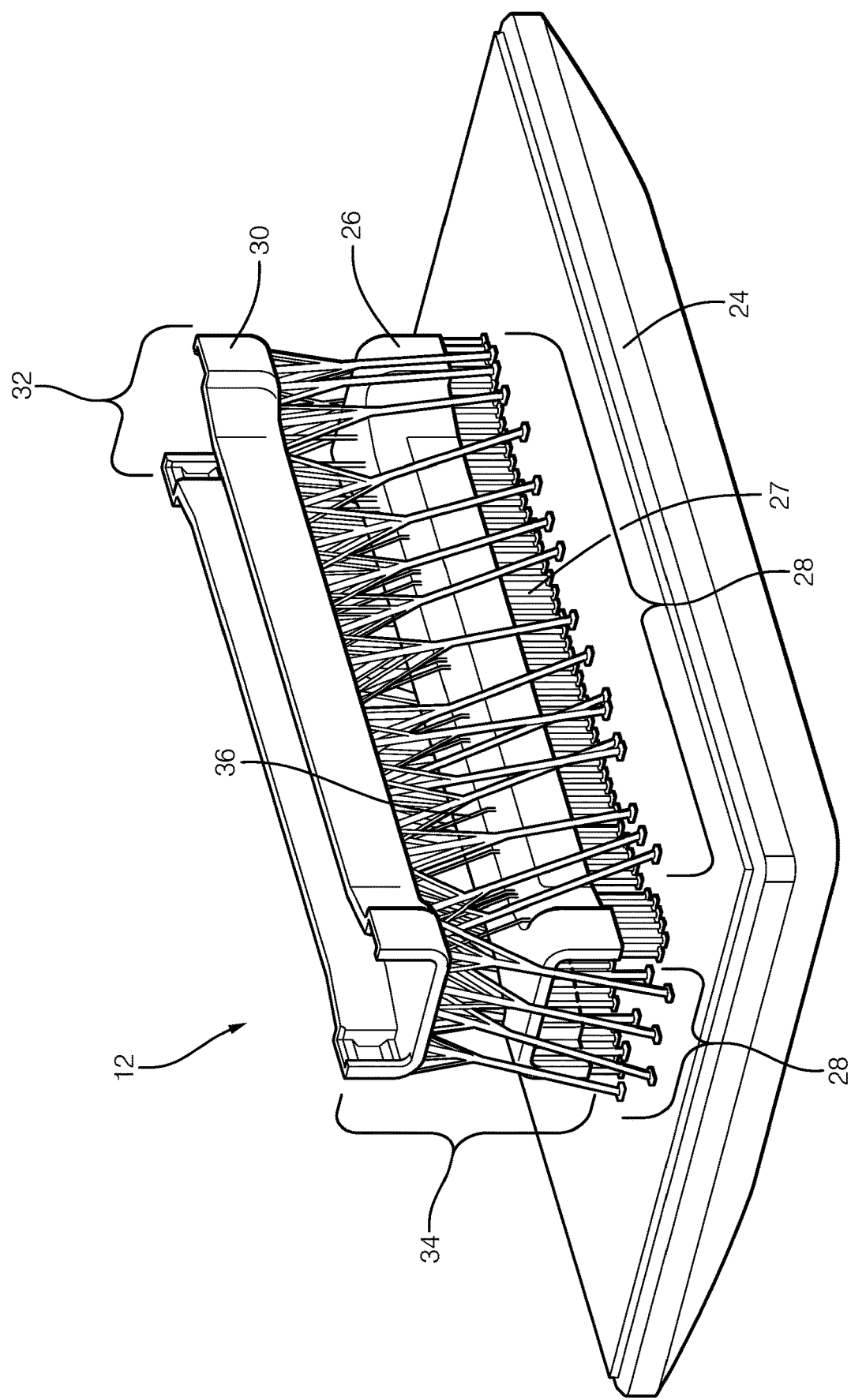
FIG. 2 is an illustration of a plurality of engineered-components produced formed using an additive manufacturing process in accordance with one embodiment.

Step 14, PROVIDE BUILD-PLATFORM, includes providing a build-platform 24 on which to form the engineered-components 12. The build-platform 24 may be any build-platform 24 compatible with additive manufacturing process equipment (not shown). The build-platform 24 may be fixed or movable and may be formed of a metallic or polymeric material. The build-platform 24 may be removable from the additive manufacturing process equipment for subsequent processes. FIG. 2 illustrates the build-platform 24 that is separate from the additive manufacturing process equipment.

Step 16, FORM FIRST ENGINEERED-COMPONENT, includes depositing a first plurality of layers of a material onto the build-platform 24 and solidifying the first plurality of layers to form a first engineered-component 26. The first engineered-component 26 may be formed by any of the known additive manufacturing processes, including stereolithography (SLA), digital light processing (DLP), fused deposition modeling (FDM), fused filament fabrication (FFF), multi-jet modeling (MJM), and 3D printing (3DP). The first engineered-component 26 may be formed in any orientation on the build-platform 24 and may be formed on a series of supports 27 that may be deposited simultaneously with the first engineered-component 26. The first engineered-component 26 may be formed of any material compatible with the additive manufacturing process selected by the user, including, but not limited to, polymeric materials, metals, and ceramic materials. FIG. 2 illustrates the first engineered-component 26 formed on supports 27 on the build-platform 24.

Step 18, FORM SUPPORT-STRUCTURES, includes forming a plurality of support-structures 28 distinct from the first engineered-component 26 by depositing a second plurality of layers of the material onto the build-platform 24 and solidifying the second plurality of layers. Step 18 may preferably be performed simultaneously with step 16 (i.e. forming the first engineered-component) as illustrated in FIG. 1. The plurality of support-structures 28 may be formed of the same material as the engineered-components 12, or may be formed of a different material that may be compatible with the engineered-components 12. The plurality of support-structures 28 may originate at the build platform 24 and may surround the first engineered-component 26 and may extend beyond the first engineered-component 26, as illustrated in FIG. 2.

Step 20, FORM SECOND ENGINEERED-COMPONENT, includes depositing a third plurality of layers of the material onto the plurality of support-structures 28 and solidifying the third plurality of layers to form a second engineered-component 30. Step 20 may be performed subsequent to step 16 (i.e. forming the first engineered-component) as illustrated in FIG. 1. The second engineered-component 30 may be formed by any of the known additive manufacturing processes, including stereolithography (SLA), digital light processing (DLP), fused deposition modeling (FDM), fused filament fabrication (FFF), multi-jet modeling (MJM), and 3D printing (3DP) and is preferably formed using the same additive manufacturing process used to form the first engineered-component 26. The second engineered-component 30 may be formed of any material compatible with the additive manufacturing process selected by the user, including, but not limited to polymeric materials, metals, and ceramic materials, and mixtures thereof. The second engineered-component 30 may be formed in any orientation on the plurality of support-structures 28 and may be identical in design to the first engineered-component 26. FIG. 2 illustrates the second engineered-component 30 that is inverted 32 relative to the first engineered-component 26 and overlaying 34 the first engineered-component 26.

Step 22, REMOVE SUPPORT-STRUCTURES, includes removing the plurality of the support-structures 28 from the second engineered-component 30. The plurality of the support-structures 28 may be removed 22 by any suitable operation, including hand-operations and automated-operations. The build-platform 24 may be separated from the additive manufacturing process equipment and installed in a device that uses the computer model or data file (e.g. CNC machine) to remove 22 the plurality of support-structures 28 while not removing material from the first engineered-component 26 and the second engineered-component 30. Additionally or alternatively, hand-operations may be used to remove the plurality of support-structures 28 or any residual material from the surfaces of the engineered-components 12.

Figure 3:
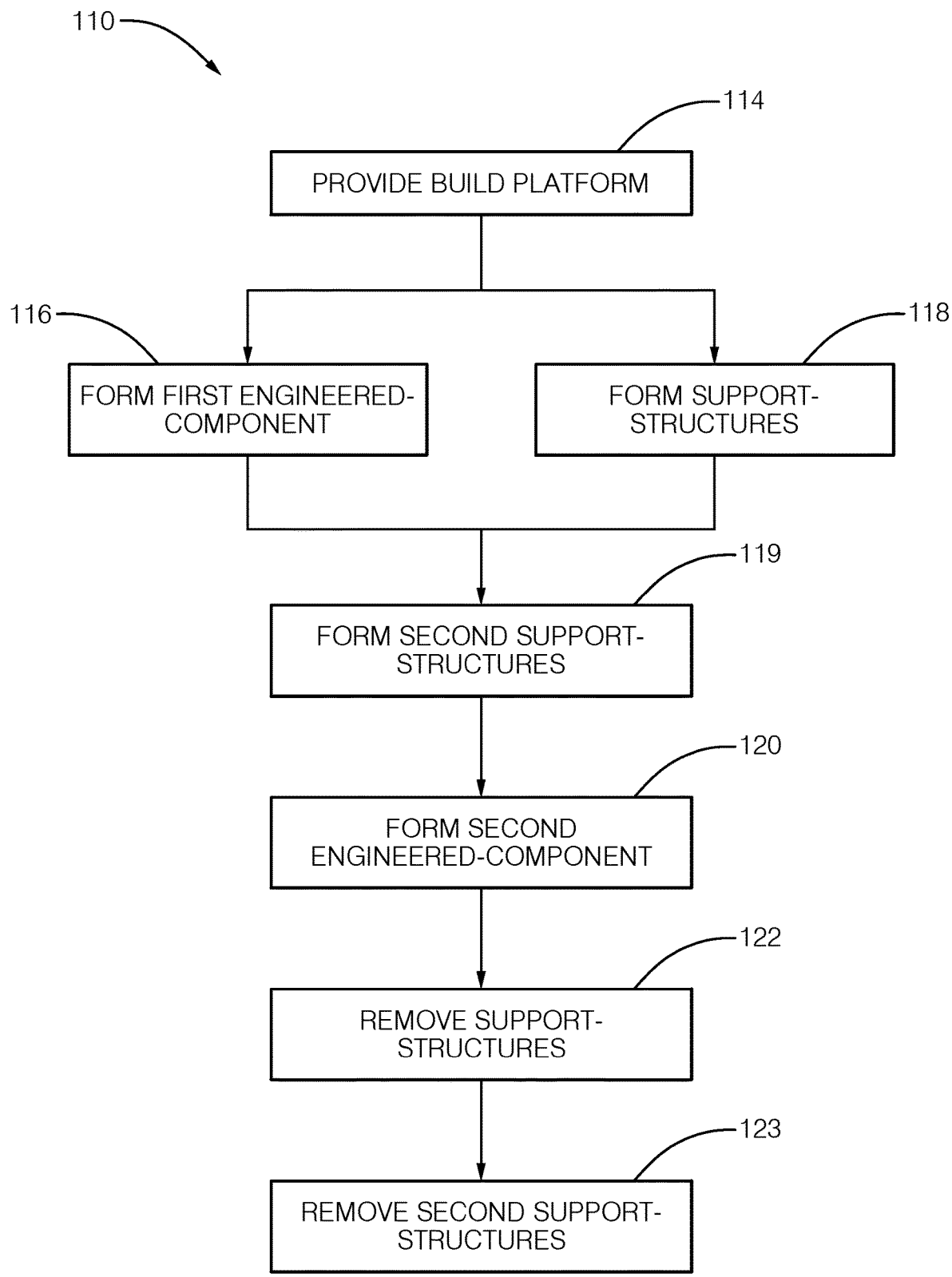
FIG. 3 is a flow chart of another method of producing a plurality of engineered-components using an additive manufacturing process in accordance with another embodiment.

FIG. 3 illustrates a non-limiting example of another method 110 of producing a plurality of engineered-components 12 using an additive manufacturing process. The method 110 includes the steps of, providing a build-platform 114, forming a first engineered-component 116, forming support-structures 118, forming second support-structures 119, forming a second engineered-component 120, removing the support-structures 122, and removing the second support-structures 123.

Step 114, PROVIDE BUILD-PLATFORM, includes providing a build-platform 24 on which to form the engineered-components 12. The build-platform 24 may be any build-platform 24 compatible with additive manufacturing process equipment (not shown). The build-platform 24 may be fixed or movable and may be formed of a metallic or polymeric material. The build-platform 24 may be removable from the additive manufacturing process equipment for subsequent processes. FIG. 2 illustrates the build-platform 24 that is separate from the additive manufacturing process equipment.

Step 116, FORM FIRST ENGINEERED-COMPONENT, includes depositing a first plurality of layers of a material onto the build-platform 24 and solidifying the first plurality of layers to form a first engineered-component 26. The first engineered-component 26 may be formed by any of the known additive manufacturing processes, including stereolithography (SLA), digital light processing (DLP), fused deposition modeling (FDM), fused filament fabrication (FFF), multi-jet modeling (MJM), and 3D printing (3DP). The first engineered-component 26 may be formed in any orientation on the build-platform 24 and may be formed on a series of supports 27 that may be deposited simultaneously with the first engineered-component 26. The first engineered-component 26 may be formed of any material compatible with the additive manufacturing process selected by the user, including, but not limited to, polymeric materials, metals, and ceramic materials. FIG. 2 illustrates the first engineered-component 26 formed on supports 27 on the build-platform 24.

Step 118, FORM SUPPORT-STRUCTURES, includes forming a plurality of support-structures 28 distinct from the first engineered-component 26 by depositing a second plurality of layers of the material onto the build-platform 24 and solidifying the second plurality of layers. Step 118 is preferably performed simultaneously with step 116 (i.e. forming the first engineered-component) as illustrated in FIG. 3. The plurality of support-structures 28 may be formed of the same material as the engineered-components 12, or may be formed of a different material that may be compatible with the engineered-components 12. The plurality of support-structures 28 may originate at the build platform 24 and may surround the first engineered-component 26 and may extend beyond the first engineered-component 26, as illustrated in FIG. 2.

Step 119, FORM SECOND SUPPORT-STRUCTURES, includes forming a second plurality of support-structures 36 by depositing a third plurality of layers of the material onto the formed first engineered-component 26, wherein the second plurality of support-structures 36 are interposed between the first engineered-component 26 and a second engineered-component 30 as illustrated in FIG. 2. The second plurality of support-structures 36 may be formed of the same material as the engineered-components 12, or may be formed of a different material that may be compatible with the engineered-components 12.

Step 120, FORM SECOND ENGINEERED-COMPONENT, includes depositing a fourth plurality of layers of the material onto the plurality of support-structures 28 and onto the second plurality of support-structures 36 and solidifying the fourth plurality of layers to form the second engineered-component 30. Step 120 may be performed subsequent to step 116 (i.e. forming the first engineered-component) as illustrated in FIG. 3. The second engineered-component 30 may be formed by any of the known additive manufacturing processes, including stereolithography (SLA), digital light processing (DLP), fused deposition modeling (FDM), fused filament fabrication (FFF), multi-jet modeling (MJM), and 3D printing (3DP) and is preferably formed using the same additive manufacturing process used to form the first engineered-component 26. The second engineered-component 30 may be formed of any material compatible with the additive manufacturing process selected by the user, including, but not limited to polymeric materials, metals, and ceramic materials, and mixtures thereof. The second engineered-component 30 may be formed in any orientation and may be identical in design to the first engineered-component 26. FIG. 2 illustrates the second engineered-component 30 that is inverted 32 relative to the first engineered-component 26 and overlaying 34 the first engineered-component 26.

Step 122, REMOVE SUPPORT-STRUCTURES, includes removing the plurality of support-structures 28 from the second engineered-component 30. The plurality of support-structures 28 may be removed 122 by any suitable operation, including hand-operations and automated-operations. The build-platform 24 may be separated from the additive manufacturing process equipment and installed in a device that uses the computer model or data file (e.g. CNC machine) to remove 122 the plurality of support-structures 28 while not removing material from the first engineered-component 26 and the second engineered-component 30. Additionally or alternatively, hand-operations may be used to remove the plurality of support-structures 28 or any residual material from the surfaces of the engineered-components 12.

Step 123, REMOVE SECOND SUPPORT-STRUCTURES, includes removing the second plurality of support-structures 36 from the second engineered-component 30 and the first engineered-component 26. The second plurality of support-structures 36 may be removed 123 by any suitable operation, including hand-operations and automated-operations. The build-platform 24 may be separated from the additive manufacturing process equipment and installed in a device that uses the computer model or data file (e.g. CNC machine) to remove 123 the second plurality of support-structures 36 while not removing material from the first engineered-component 26 and the second engineered-component 30. Additionally or alternatively, hand-operations may be used to remove the second plurality of support-structures 36 or any residual material from the surfaces of the engineered-components 12.

Accordingly, a method 10 of producing a plurality of engineered-components 12 using an additive manufacturing process is provided. The method 10 is beneficial because it enables the formation of a plurality of engineered-components 12 that overlay 34 one another on a single build-platform 24, which increases the utilization time of additive manufacturing process equipment.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items. Additionally, directional terms such as upper, lower, etc. do not denote any particular orientation, but rather the terms upper, lower, etc. are used to distinguish one element from another and locational establish a relationship between the various elements.

We claim:

1. A method of producing a plurality of engineered-components using an additive manufacturing process, said method comprising the steps of:
 a) providing a build-platform;
 b) forming a series of supports by depositing a first plurality of layers of a material onto the build-platform and solidifying the first plurality of layers thereto;
 c) forming a first engineered-component by depositing a second plurality of layers of the material onto the series of supports and solidifying the second plurality of layers thereto;
 d) forming a plurality of elongate support-structures separate from the series of supports by depositing a third plurality of layers of the material onto the build-platform and solidifying the third plurality of layers thereto, wherein this step is performed during steps b) and c); and
 e) forming a second engineered-component by depositing a fourth plurality of layers of the material onto the plurality of elongate support-structures and solidifying the fourth plurality of layers thereto, wherein this step is performed after step c).

2. The method according to claim 1, further comprising the step of:
   f) forming a second plurality of elongate support-structures by depositing a fifth plurality of layers of the material onto the formed first engineered-component, wherein said second plurality of elongate support-structures are interposed between the first engineered-component and the second engineered-component.

3. The method according to claim 2, further comprising the step of:
   g) removing the second plurality of elongate support-structures from both the first engineered-component and the second engineered-component.

4. The method according to claim 1, wherein the second engineered-component is formed overlying the first engineered-component.

5. The method according to claim 4, wherein the second engineered-component is identical to the first engineered-component.

6. The method according to claim 5, wherein the second engineered-component is formed in an inverted orientation relative to the first engineered-component.

7. The method according to claim 1, wherein the additive manufacturing process is selected from a list consisting of stereolithography (SLA), digital light processing (DLP), fused deposition modeling (FDM), fused filament fabrication (FFF), multi-jet modeling (MJM), and 3D printing (3DP).

8. The method according to claim 1, wherein the first engineered-component and the plurality elongate support-structures are formed of a same material.

9. The method according to claim 1, wherein the first engineered-component and the plurality of elongate support-structures are formed of a different material.

10. The method according to claim 1, wherein the second engineered-component and the plurality of elongate support-structures are formed of a same material.

11. The method according to claim 1, wherein the first engineered-component and the series of supports are formed of a different material.

12. The method according to claim 1, further comprising the step of:
   h) removing the series of supports from the first engineered-component.

13. The method according to claim 1, further comprising the step of:
   i) removing the plurality of elongate support-structures from the second engineered-component.

14. The method according to claim 1, wherein at least one support-structure of the plurality of elongate support-structures includes a plurality of branches extending between the at least one support-structure and the second engineered-component.

* * * * *